Patented Dec. 7, 1937

2,101,321

UNITED STATES PATENT OFFICE 2,101,321

**HYDROXY COMPOUNDS OF THE DIBENZ-
ANTHRONE SERIES**

Heinrich Neresheimer, Anton Vilsmeier, and Robert Held, Ludwigshafen-on-the-Rhine, Germany, assignors to General Aniline Works, Inc., New York, N. Y., a corporation of Delaware No Drawing. Application July 8, 1936, Serial
No. 89,652. In Germany July 10, 1935

4 Claims. (Cl. 260—61)

The present invention relates to hydroxy compounds of the dibenzanthrone series.

We have found that hydroxy compounds of the dibenzanthrone series are obtained by treating Bz - amino - Bz2.Bz2' - dihydroxy-dibenzanthrones or the corresponding diquinones with hydrolyzing agents or by heating dibenzanthrone-Bz2.Bz2'-quinones which contain in the Bz3-positions no amino groups but which contain hydrogen in at least one of the Bz3-positions with concentrated or moderately diluted sulphuric acid.

As initial materials for the said treatment of the Bz-amino compounds with hydrolyzing agents may be mentioned the compounds having the following compositions:—

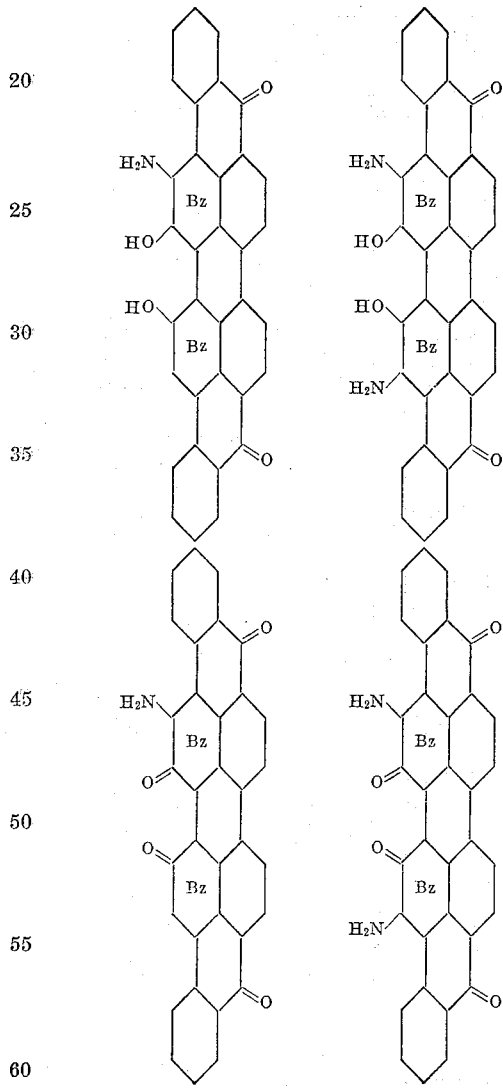

and their derivatives which can be prepared, for example, according to the British Patent No. 442,860.

As hydrolyzing agents may be mentioned for example water and solutions of acids, bases or salts in water or other diluents.

The reaction is generally speaking preferably effected by heating. The splitting of the amino compounds may also sometimes be carried out with advantage in the same working operation as their preparation. Thus for example by heating a suspension of Bz3.Bz3'-diamino-Bz2.Bz2'-dihydroxydibenzanthrone in dilute sulphuric acid at from 220° to 230° C. for about ten hours, Bz2,-Bz2',Bz3,Bz3'-tetrahydroxydibenzanthrone is obtained in a good yield. Under the same conditions, a dibromotetrahydroxydibenzanthrone is obtained from dibromo-Bz3,Bz3'-diamino-Bz2,-Bz2'-dihydroxydibenzanthrone. For the preparation of the same compound, a solution of the dibromo - diamino - dihydroxy-dibenzanthrone in concentrated sulphuric acid such as is obtained during its preparation may, however, also be employed after the separation of undissolved constituents, dilution with water and heating to from 220° to 230° C.

If, instead of diaminodihydroxydibenzanthrone, the diaminodiquinone be employed as initial material, the corresponding diquinone is obtained.

The said heating of dibenzanthrone-Bz2,Bz2'-quinones which contain in the Bz3-positions no amino groups but which contain hydrogen in at least one of the Bz3-positions with sulphuric acid may be promoted by the addition of catalysts such as vanadium, mercury, selenium compounds, nitrosyl sulphuric acid or by leading in air. The Bz2,Bz2'-dibenzanthrone quinones employed as initial materials may also be prepared, if desired, in the same operation, as for example from Bz2,Bz2'-dihydroxy- or Bz2,Bz2'-dialkoxydibenzanthrones, dibenzanthrone or 2,2'-dibenzanthronyl.

When desired, the said hydroxydibenzanthrones may be purified for example by crystallization from or by washing with concentrated or moderately diluted sulphuric acid. In many cases the introduction of further atoms or radicles may be combined with the preparation of the said hydroxydibenzanthrones. Thus for example by heating Bz3-aminodibenzanthrone-Bz2.Bz2'-quinone with dilute hydrochloric acid a compound containing chlorine may be simultaneously produced. Moreover by the reaction of Bz3-amino-Bz2,Bz2'-dihydroxydibenzanthrone with dilute hydrochloric acid, compounds containing chlorine are sometimes formed.

The said hydroxydibenzanthrones are in part dyestuffs and in part they may be employed for the preparation of dyestuffs.

The following examples will further illustrate how our said invention may be carried out in practice but the invention is not restricted to these examples. The parts are by weight.

*Example 1*

25 parts of Bz3-amino-Bz2,Bz2'-dihydroxydibenzanthrone are heated at from 220° to 230° C. for ten hours with 750 parts of 10 per cent sulphuric acid. After cooling, the compound obtained in almost the calculated yield is filtered off by suction and if desired crystallized from concentrated or moderately diluted sulphuric acid for the purpose of purification. The concentrated solution of the purified compound in pyridine is yellowish green and it becomes greenish blue by dilution with more pyridine. The compound dissolves in concentrated sulphuric acid giving a violet coloration. According to its manner of preparation, analysis and its properties it is Bz2,Bz2',Bz3-trihydroxydibenzanthrone. It yields a greenish-blue vat from which cotton is dyed powerful blue-green shades.

Instead of dilute sulphuric acid, dilute hydrochloric acid, acetic acid or sodium carbonate solution may be employed for splitting off the amino group, a compound containing chlorine being obtained at the same time when employing dilute hydrochloric acid.

*Example 2*

25 parts of Bz3-aminodibenzanthrone-Bz2,Bz2'-quinone (obtainable by the oxidation of the Bz3-amino-Bz2,Bz2'-dihydroxydibenzanthrone employed in Example 1 with ferric sulphate in dilute sulphuric acid) are heated for ten hours at from 220° to 230° C. with 750 parts of 10 per cent sulphuric acid. Blue-green needles are obtained which are filtered off by suction, washed with water and dried. The resulting dyestuff obtained in an excellent yield is almost entirely free from nitrogen. It dissolves in concentrated sulphuric acid giving a cloudy brownish violet coloration; the solution becomes pure bluish violet by the addition of hydroquinone.

The new dyestuff, which is to be regarded as the quinone of the Bz2,Bz2',Bz3-trihydroxydibenzanthrone described in Example 1, may be reduced to the trihydroxy compound by dilute sodium bisulphite solution.

*Example 3*

25 parts of Bz3,Bz3'-diaminodibenzanthrone-Bz2,Bz2'-quinone (obtainable by the oxidation of Bz3,Bz3'-diamino-Bz2,Bz2'-dihydroxydibenzanthrone with ferric sulphate in dilute sulphuric acid) are brought into a state of fine dispersion by dissolution in concentrated sulphuric acid and precipitation with water and then heated with 750 parts of 10 per cent sulphuric acid for ten hours at from 220° to 230° C. Olive-grey needles practically free from nitrogen are obtained which dissolve in concentrated sulphuric acid giving a brownish olive coloration; the solution becomes blue-violet by the addition of hydroquinone. The new compound is Bz3,Bz3'-dihydroxydibenzanthrone-Bz2,Bz2'-quinone which is converted by boiling with dilute sodium bisulphite solution into Bz2,Bz2',Bz3,Bz3'-tetrahydroxydibenzanthrone. The concentrated solution of the reduced compound in pyridine is green and when diluted with more pyridine the color changes to violet-blue. It yields olive-green dyeings on cotton from a greenish blue vat.

If 25 parts of Bz3,Bz3'-diamino-Bz2,Bz2'-dihydroxydibenzanthrone be employed instead of Bz3,Bz3'-diaminodibenzanthrone-Bz2,Bz2'-quinone, the Bz2,Bz2',Bz3,Bz3'-tetrahydroxydibenzanthrone mentioned above is directly obtained.

*Example 4*

The dibromo-Bz3,Bz3'-diaminodibenzanthrone-Bz2,Bz2'-quinone to be employed according to this example may be obtained as follows:—100 parts of the bromo compound of Bz2,Bz2'-dimethoxydibenzanthrone obtainable according to Example 1 of the British Patent No. 205,304 are introduced at 50° C. into a mixture of 500 parts of glacial acetic acid and 750 parts of 98 per cent nitric acid and the mixture is heated slowly to 90° C. and kept at the said temperature until the compound formed appears to be uniformly crystallized. The whole is allowed to cool to 50° C. The nitro compound is filtered off by suction, washed with glacial acetic acid and water and dried. 22 parts of the dibrom-Bz3,Bz3'-dinitrodibenzanthrone-Bz2,Bz2'-quinone thus obtained are introduced into a solution of 25 parts of crystallized boric acid in 380 parts of sulphuric acid monohydrate. After stirring for some time at 20° C., 200 parts of fuming sulphuric acid containing 23 per cent of $SO_3$ are introduced. 15.5 parts of copper powder are then introduced into the resulting solution during the course of about five hours at from 20° to 25° C. The whole is further stirred for half an hour at 25° C. The copper sludge is then filtered off by suction and the compound formed is obtained in the form of dark flakes by pouring the sulphuric acid filtrate into water. It is filtered off by suction, washed and dried. According to its properties and analysis it is a dibrom-Bz2,Bz2'-dihydroxy-Bz3,Bz3'-diaminodibenzanthrone which by treatment with ferric sulphate in dilute sulphuric acid is converted into the said quinone.

25 parts of the dibrom-Bz3,Bz3'-diaminodibenzanthrone-Bz2,Bz2'-quinone thus obtained are treated with 10 per cent sulphuric acid in the manner described in Example 3. A dibrom-Bz3,Bz3'-dihydroxydibenzanthrone-Bz2,Bz2'-quinone is thus obtained. It dissolves in concentrated sulphuric acid giving a pale brownish coloration which becomes violet upon the addition of hydroquinone. The concentrated solution of the compound reduced by means of sodium bisulphite solution in pyridine is green and becomes blue by the addition of more pyridine.

The same compound is obtained by freeing the violet solution of the amino compound used as initial material above in concentrated sulphuric acid from undissolved constituents, diluting it with water and heating it for a time at from 220° to 230° C.

By employing, instead of the said dibrom-Bz3,Bz3'-diaminodibenzanthrone-Bz2,Bz2'-quinone, a Bz3,Bz3'-diaminodibenzanthrone-Bz2,Bz2'-quinone containing chlorine (obtainable for example from Bz2,Bz2'-dimethoxydibenzanthrone containing chlorine by nitration, reduction and oxidation to the corresponding quinone according to the method of working described in the first paragraph of this example) a Bz3,Bz3'-dihydroxydibenzanthrone-Bz2,Bz2'-quinone containing chlorine is obtained.

*Example 5*

A solution of 10 parts of Bz2,Bz2'-dibenzanthronequinone is about 335 parts of 89 per cent sulphuric acid (prepared by heating a solution of 10 parts of Bz2,Bz2'-dihydroxydibenzanthrone in 250 parts of 96 per cent sulphuric acid with 10 parts of a nitrosyl sulphuric acid containing 16.5 per cent of nitrous acid at 70° C. and adding 75 parts of 62.5 per cent sulphuric acid) are heated at from 110° to 115° C., after adding 0.4 part of ammonium vanadate, until initial material can no longer be detected. The mixture is then allowed to cool to about 50° C. The solid substance precipitated is filtered off by suction and washed with about 90 per cent sulphuric acid. It contains the Bz2,Bz2',Bz3-trihydroxydibenzanthrone described in Example 1 and also the corresponding diquinone. It may be converted completely into the trihydroxy compound by boiling its suspension in dilute sulphuric acid with sodum bisulphite.

Instead of ammonium vanadate, other catalysts may be used, as for example selenious acid. Instead of preparing the Bz2,Bz2'-dibenzanthronequinone from the Bz2,Bz2'-dihydroxydibenzanthrone in the reaction mixture, it may be dissolved as such in sulphuric acid of suitable strength and the solution used for the reaction.

If the reaction be carried out in the absence of catalysts, it is preferable to employ more active conditions, as for example a higher temperature and/or a longer period of reaction. The trihydroxy compound formed, if necessary after treatment with sodium bisulphite, may be readily separated from dihydroxydibenzanthrone or dibenzanthronequinone which may still be present in the final product by dissolving it out with organic solvents of high boiling point or by dissolving the mixture in concentrated sulphuric acid and diluting the solution in stages with water.

*Example 6*

A mixture of 10 parts of Bz2,Bz2'-dihydroxydibenzanthrone, 200 parts of 96 per cent sulphuric acid and 10 parts of nitrosyl sulphuric acid having a content of 16.5 per cent of nitrous acid is heated at 70° C. 75 parts of 62.5 per cent sulphuric acid are then allowed to flow in and 0.4 part of mercuric sulphate is added to the solution. The whole is heated during the course of about 24 hours to from 150° to 155° C. and kept at this temperature until the reaction is completed. After working up in the manner described in Example 1, the trihydroxy compound described therein is obtained in good yields.

*Example 7*

A mixture of 10 parts of brominated dimethoxydibenzanthrone (prepared according to Example 1 of the British Patent No. 205,304), 1 part of ammonium vanadate and 200 parts of sulphuric acid monohydrate is stirred for some hours at room temperature. 10 parts of glacial acetic acid are then added to the solution and the whole heated at from 195° to 200° C. for from about ½ to ¾ hour, and allowed to cool to about 50° C. The resulting compound is filtered off by suction and washed with a mixture of 95 parts of sulphuric acid monohydrate and 5 parts of glacial acetic acid.

The residue is worked up and, if necessary, aftertreated with a little amount of a reducing agent in the manner described in the foregoing examples. The Bz2,Bz3,Bz3'-trihydroxydibenzanthrone which contains about 2 atoms of bromine in the molecule dissolves in concentrated sulphuric acid giving a violet coloration, in pyridine giving a turbid blue-green coloration.

If instead of a brominated dimethoxydibenzanthrone, a chlorinaed dimethoxydibenzanthrone, such as may be obtained for example according to the U. S. Patent 1,926,555, be employed as initial material, a final product containing chlorine is obtained.

*Example 8*

25 parts of Bz2,Bz2'-dihydroxydibenzanthrone and 91 parts of nitrosyl sulphuric acid containing 14.3 per cent of nitrous acid are introduced into a mixture of 506 parts of 96 per cent sulphuric acid, 34 parts of water and 1 part of selenium dioxide. The mixture is heated at 110° C. until unchanged initial material can no longer be detected. After cooling the reaction product is filtered off by suction, washed with 80 per cent sulphuric acid and worked up in the manner described in Example 5.

*Example 9*

A solution of 1 part Bz2,Bz2'-dibenzanthronequinone in 30 parts of 90 per cent sulphuric acid is stirred at from 110° to 115° C. until initial material is no longer detectable. After cooling the crystals deposited are filtered off by suction, washed with 80 per cent sulphuric acid and worked up in the manner described in Example 5.

The Bz2,Bz2',Bz3 - trihydroxydibenzanthrone thus prepared contains still some Bz2,Bz2'-dihydroxydibenzanthrone. A reaction product practically free from Bz2,Bz2'-dihydroxydibenzanthrone is obtained if the reaction described in the preceding paragraph is carried out while adding 0.2 part of nitrosyl sulphuric acid containing 14.3 parts of nitrous acid.

*Example 10*

10 parts of 2,2'-dibenzanthronyl are dissolved while stirring in 23 parts of 96 per cent sulphuric acid. The solution is then diluted to a content of 84 per cent sulphuric acid by adding water and little amounts of pyrolusite are introduced at room temperature until unchanged initial material is no longer present. To the suspension of Bz2,Bz2'-dibenzanthronequinone thus obtained 70 per cent oleum is added until the solution has a content of 92 per cent sulphuric acid and then 0.4 part of vanadium pentoxide and 6 parts of nitrosyl sulphuric acid containing 14.3 parts of nitrous acid are added. The mixture is then heated at 110° C. while stirring until unchanged Bz2,Bz2'-dibenzanthronequinone can no longer be detected. After cooling the resulting crystal pulp is filtered off by suction and further worked up according to Example 5. Bz2,Bz2',Bz3-trihydroxydibenzanthrone is thus obtained in a good yield and in a practically pure form.

*Example 11*

A mixture of 10 parts of Bz2,Bz2'-dibenzanthronequinone, 0.05 part of vanadium pentoxide, 1.2 parts of nitrosyl sulphuric acid containing 14.3 parts of nitrous acid and 300 parts of 90 per cent sulphuric acid is stirred while leading through air at about 110° C. until unchanged initial material is no longer detectable. The mixture is then cooled to 40° C., diluted with water to a content of 82 per cent sulphuric acid, the resulting precipitate filtered off by suction, washed with water and dried. The reaction product is practically pure Bz2,Bz2',Bz3-trihydroxydibenzanthrone.

What we claim is:

1. The hydroxy compounds of the dibenzanthrone series selected from the class consisting of unsubstituted Bz2,Bz2′,Bz3-trihydroxydibenzanthrone, the unsubstituted Bz2,Bz2′,Bz3,Bz3′-tetrahydroxydibenzanthrone, the Bz3-hydroxydibenzanthrone-Bz2,Bz2′-quinone, the Bz3,Bz3′-dihydroxydibenzanthrone-Bz2,Bz2′-quinone, and the halogenated derivatives of these compounds.

2. Bz2,Bz3,Bz3′-trihydroxydibenzanthrone.

3. Bz2,Bz2′,Bz3,Bz3′ - tetrahydroxydibenzanthrone.

4. The dibromo-Bz2,Bz2′,Bz3 - trihydroxydibenzanthrone dissolving in concentrated sulphuric acid giving a violet coloration and in pyridine giving a blue-green coloration.

HEINRICH NERESHEIMER.
ANTON VILSMEIER.
ROBERT HELD.